(12) United States Patent
Hopkins

(10) Patent No.: US 7,267,281 B2
(45) Date of Patent: Sep. 11, 2007

(54) LOCATION, ORIENTATION, PRODUCT AND COLOR IDENTIFICATION SYSTEM FOR THE BLIND OR VISUALLY IMPAIRED

(76) Inventor: Billy D. Hopkins, 303 Scotts Glen Dr., Springfield, OR (US) 97477

( * ) Notice: Subject to any disclaimer, the term of this patent is extended or adjusted under 35 U.S.C. 154(b) by 0 days.

(21) Appl. No.: 10/994,972

(22) Filed: Nov. 23, 2004

(65) Prior Publication Data

US 2006/0108426 A1    May 25, 2006

(51) Int. Cl.
G06K 7/10 (2006.01)
G06K 9/22 (2006.01)
G09B 21/00 (2006.01)

(52) U.S. Cl. .................. 235/462.45; 135/911; 434/112
(58) Field of Classification Search ................ 235/375, 235/435, 454, 462.01, 462.31, 462.43, 487, 235/462.45; 341/21; 434/112, 116; 135/65–67, 135/911; 367/101, 107, 116
See application file for complete search history.

(56) References Cited

U.S. PATENT DOCUMENTS

| | | | | |
|---|---|---|---|---|
| 3,718,896 A | * | 2/1973 | Mowat | 367/95 |
| 4,025,922 A | * | 5/1977 | Trawick, III | 342/24 |
| 4,280,204 A | * | 7/1981 | Elchinger | 367/116 |
| 4,459,689 A | * | 7/1984 | Biber | 367/107 |
| 4,551,825 A | * | 11/1985 | Biber | 367/101 |
| 4,712,003 A | * | 12/1987 | Ban et al. | 250/221 |
| 4,858,125 A | * | 8/1989 | Washizuka et al. | 600/301 |
| 5,097,856 A | * | 3/1992 | Chi-Sheng | 135/72 |
| 5,219,402 A | * | 6/1993 | Kondo et al. | 135/66 |
| 5,301,703 A | * | 4/1994 | Kahn | 135/77 |
| 5,331,990 A | * | 7/1994 | Hall et al. | 135/65 |
| 5,341,346 A | * | 8/1994 | Youlton | 367/99 |
| 5,351,704 A | * | 10/1994 | Hunnicutt et al. | 135/66 |
| 5,487,669 A | * | 1/1996 | Kelk | 434/112 |
| 5,682,030 A | * | 10/1997 | Kubon | 235/462.25 |
| 5,687,136 A | * | 11/1997 | Borenstein | 367/116 |
| 5,724,313 A | * | 3/1998 | Burgess et al. | 367/116 |
| 5,804,805 A | * | 9/1998 | Koenck et al. | 235/462.01 |

(Continued)

FOREIGN PATENT DOCUMENTS

| | | | |
|---|---|---|---|
| EP | EP0145096 | * | 6/1985 |
| FR | 2628968 | * | 9/1989 |
| FR | 2628968 A1 | * | 9/1989 |

(Continued)

Primary Examiner—Daniel Walsh
(74) Attorney, Agent, or Firm—Ater Wynne LLP

(57) ABSTRACT

Barcode scanning and digitizing technology incorporated in the tip of a white cane for the blind, which houses barcode reader, sonar, color sensory and audio production mechanisms. Apparatus detects and announces via audio or vibratory output, obstacles, drop-offs, colors or suitable informational barcode sites placed with a plurality of locations or environments for assisting blind or visually impaired users to navigate. In one embodiment, the apparatus combines the white cane with a barcode scanner and decoder with laser depth finding capacity in the cane tip, an sonar technology within the cane housing; and a separate hand-held unit having color and standard UPC barcode scanners, both the cane and the hand-held unit being connected to the audio output device by a hard-wire or wireless connection. The audio production unit can be pocket or purse carried and emits verbal information via respective barcodes suitable for either component or announces color when the respective scanner is used; hand-held color/barcode scanner or cane can be used separately or simultaneously.

11 Claims, 10 Drawing Sheets

U.S. PATENT DOCUMENTS

| | | | |
|---|---|---|---|
| 5,933,082 A * | 8/1999 | Abita et al. | 340/541 |
| 5,934,300 A * | 8/1999 | Breton | 135/65 |
| 5,936,528 A * | 8/1999 | Kobayashi et al. | 340/572.5 |
| 5,973,618 A * | 10/1999 | Ellis | 340/990 |
| 5,975,100 A * | 11/1999 | Sfeir | 135/66 |
| 6,011,481 A * | 1/2000 | Luther et al. | 340/686.1 |
| 6,011,754 A * | 1/2000 | Burgess et al. | 367/116 |
| 6,298,010 B1 * | 10/2001 | Ritz et al. | 367/116 |
| 6,489,605 B1 * | 12/2002 | Ritz et al. | 250/221 |
| 6,497,367 B2 * | 12/2002 | Conzola et al. | 235/462.45 |
| 6,671,226 B1 * | 12/2003 | Finkel et al. | 367/116 |
| 6,710,706 B1 * | 3/2004 | Withington et al. | 340/407.1 |
| 6,745,786 B1 * | 6/2004 | Davis | 135/65 |
| 2002/0158133 A1 * | 10/2002 | Conzola et al. | 235/462.45 |
| 2005/0099306 A1 * | 5/2005 | Gilfix et al. | 340/573.1 |
| 2005/0099318 A1 * | 5/2005 | Gilfix et al. | 340/825.19 |
| 2005/0227207 A1 * | 10/2005 | McAdams et al. | 434/114 |
| 2006/0108426 A1 * | 5/2006 | Hopkins | 235/462.45 |
| 2006/0170230 A1 * | 8/2006 | Lee | 294/19.2 |

FOREIGN PATENT DOCUMENTS

| | | | |
|---|---|---|---|
| FR | 2766579 | * | 7/1997 |
| FR | 2628968 | * | 3/2005 |
| GB | 2184588 | * | 6/1987 |
| JP | 409122190 | * | 5/1997 |
| JP | 410102442 | * | 3/1998 |
| JP | 11016085 A | * | 1/1999 |
| JP | 411016085 | * | 1/1999 |
| JP | 11276516 A | * | 10/1999 |
| JP | 411276516 | * | 10/1999 |
| JP | 2004159693 A | * | 6/2004 |
| JP | 02003093454 | * | 4/2005 |
| JP | 02002165849 | * | 6/2005 |
| JP | 02002197586 | * | 7/2005 |
| JP | 02001353194 | * | 12/2005 |
| JP | 200546607 | * | 2/2006 |
| JP | 2002296024 A | * | 10/2006 |

* cited by examiner

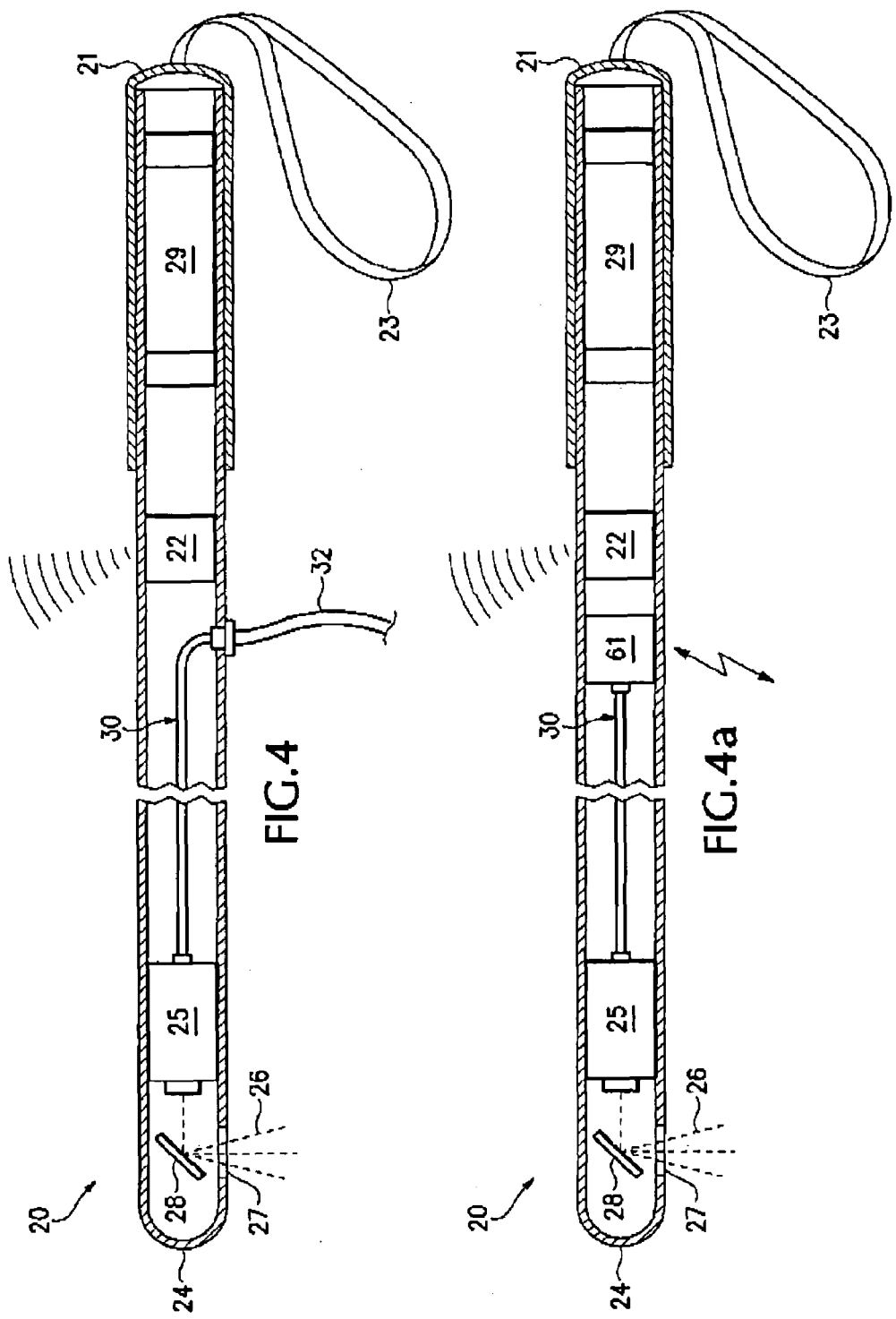

STORE SHELVES WITH UPC BARCODE

LOCATION, ORIENTATION, PRODUCT AND COLOR IDENTIFICATION SYSTEM FOR THE BLIND OR VISUALLY IMPAIRED

BACKGROUND OF THE INVENTION

The invention is related to the fields of assistive technology, orientation and mobility (O&M) and informational aids/systems for those with blindness or other forms of vision loss. For many years there have been attempts to provide systems that would inform a blind or visually impaired (B&VI) pedestrian as to their location, direction of travel and the environment surrounding them. Many of these more current systems employ radio frequency (RF) transponders and make a positive example of the inadequacies of many of these attempts.

For example, U.S. Pat. No. 5,144,294 describes an apparatus including a portable RF transceiver carried by the user and a stationary base RF transceiver unit. The portable RF transmitter transmits a message request signal in response to manual activation of a transmit button by the user. Finding the transmit button while simultaneously orienting within an environment challenges a B&VI pedestrian, and the use of a large number of transmitters located within any city environment appears unfeasible with expanding complex electronic and telecommunication devices.

There are apparatuses based on white canes for the B&VI that incorporate other technologies, such as sonar and laser technology. Both work as obstacle or hazard detectors for the B&VI traveler. However, neither hazard detection component has been incorporated into a white cane with other modem advancements, such as barcode systems, global positioning satellite (GPS) or laser technologies.

Similarly, there are devices available that scan and/or identify products through the use of the Universal Product Code (UPC) barcode system. Presently however, there are no such devices that access B & VI persons to general product information through audio output, and only one device will scan and read via audio output a UPC on specific drug containers (insulin). There are also devices that will identify via audio output the colors of objects or products. However there are currently no such devices that will, through audio output, identify both product UPC codes and colors through a combined scanning audio output system.

Persons who are B&VI have varying levels of difficulty in finding or accurately orienting themselves to any given location. For B&VI travelers, identifying a current location, orienting within a strange or subsequently new environment or locating a potential small objective is problematic. Locating a particular street or building, a street address or block number or any smaller objective during daily mobility are difficult objectives for vision-impaired pedestrians. These O & M tasks however, are of primary importance during any B & VI traveler's daily activities. The ability to negotiate safe orientation within a subsequent environment is the secondary yet no less important objective of a blind traveler's O & M. The final common objective during O & M is often the location and identification of small objectives. A B & VI pedestrian may have difficulty finding a certain street or address, then have problems locating a bus stop, entrance, doorway or bus route sign, and once these objectives are completed, problems arise in locating or identifying secondary micro-environmental objectives, such as restroom entrances, product storage areas or specific small objectives like individual products or the color of said products or items.

SUMMARY OF THE INVENTION

The major component or location orienting system of the present invention includes and interacts with a plurality of informational barcode sites located on city sidewalks, intersections, and at or upon other locations. Each informational barcode site contains information about its location in a barcode format. A barcode scanner is located adjacent to and at the lower end (tip) of a white cane carried by a blind or visually impaired user. The barcode scanner is adapted to read the respective barcode contained at the informational barcode site by passing the tip of the cane containing the barcode scanner over the informational barcode site. The barcode scanner generates an electrical signal that is relayed to a microcomputer component worn by the blind or visually impaired user. The microcomputer decodes the barcode information into a signal that is sent to a speech synthesizer. The speech synthesizer generates an audio signal that is transmitted to an earphone worn on the ear by the blind or visually impaired user.

The signal generated by the barcode scanner can be transmitted to the microcomputer by wiring connecting the two, or by sending the signal to a transmitter located within the cane and wirelessly transmitting the signal to the microcomputer component.

A complimentary portable, hand-held component can be used either separately or simultaneously with the primary white cane-audio components, to provide audio information to users on either barcode (UPC) product information or the color of a product or item. This hand-held component utilizes standard UPC barcode scanner technology to process barcode site information obtained via the said sites in a plurality of product environment locations. The complimentary portable component also incorporates color scanner technology to process the colors in a plurality of product and daily activity environments. Both incorporated UPC product and color scanner's can independently generate electrical signals to be transmitted to the microcomputer. Signal transmission can be completed by either wiring to connect the scanner to the microcomputer, or by sending the signal to a wireless transmitter located within the hand-held component and wirelessly transmitting the signal to the microcomputer.

Thus, the invention allows blind or visually impaired (B & VI) pedestrians safely to negotiate unfamiliar or known environments that have been marked with barcodes, to obtain detailed audio/verbal information that sighted pedestrians generally have access to, and to avoid typical and/or dangerous hazards on their route by sensing the vibrating handle or hearing the drop-off alert. Additionally and upon their safe arrival at various destinations, the B & VI pedestrian can have safe and equal audio/verbal access to information regarding myriad route, distance, destination, transportation, product, etc., all subject to being bar coded.

BRIEF DESCRIPTION OF THE DRAWINGS

FIG. 4 is a side elevation view in cross-section of a cane incorporating a barcode scanner that is wired to the receiver;

FIG. 4a is a side elevation view in cross-section of a cane incorporating a barcode scanner that is wireless to the receiver;

DESCRIPTION OF PREFERRED EMBODIMENTS

Figure 1:
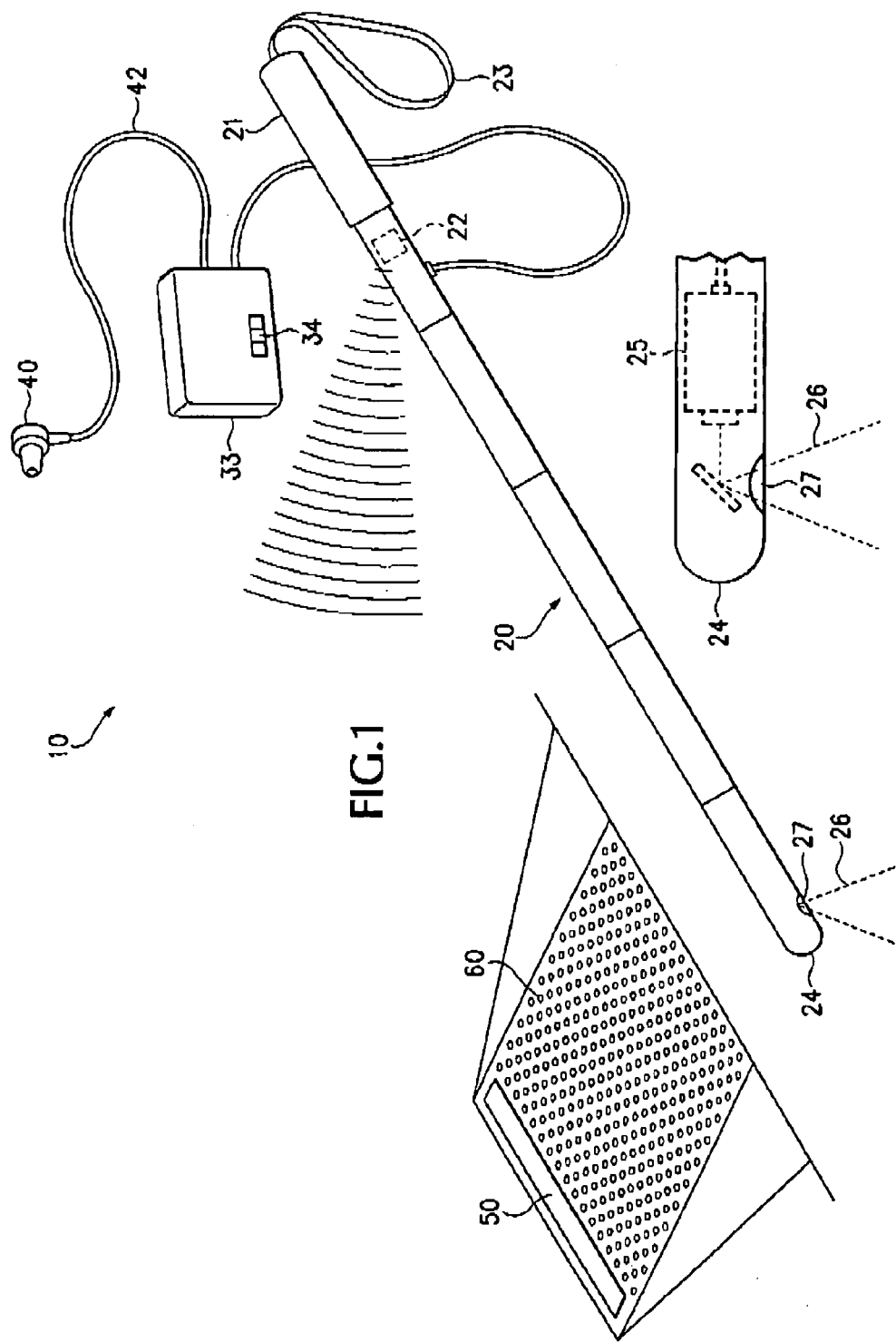
FIG. 1 is an isometric view of the location orienting system of the present invention wherein the barcode scanner is connected to the microcomputer wirelessly, illustrating a street comer barcode being scanned for user geographic location information.
Figure 2:
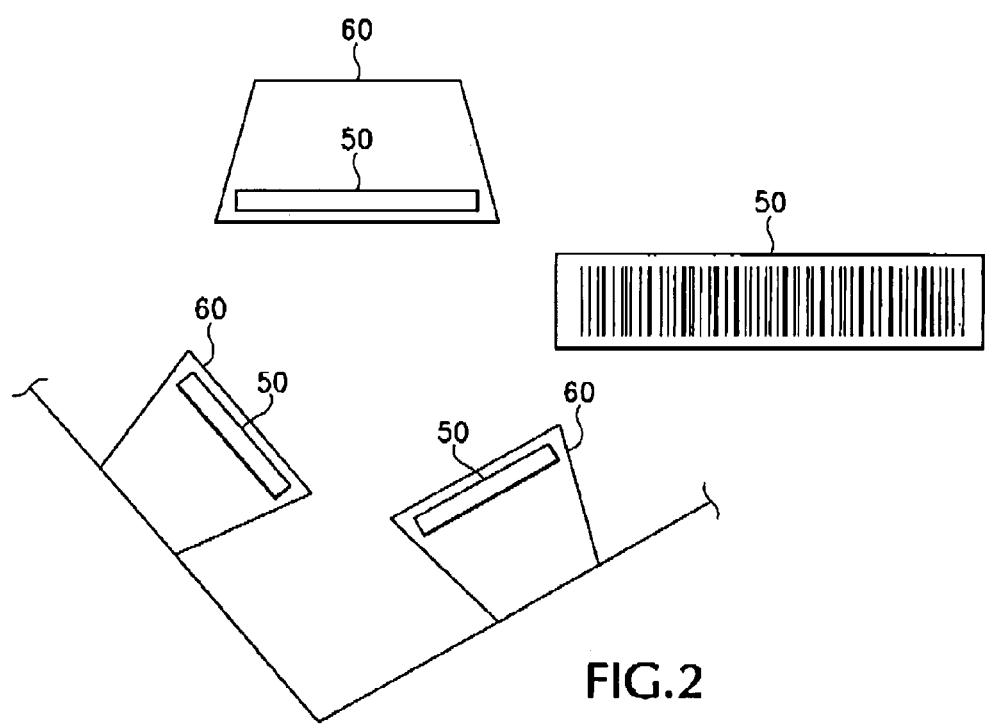
FIG. 2 is a block diagram of the location orienting system of the present invention wherein the informational barcode having elongate bars with two different colors are located on various barcode sites such as truncated dome/tiles at street comers shown schematically in aerial view.

Broadly speaking, location, orientation, and color identification systems for the blind or visually impaired are described. Those of skill in the art will appreciate that the component parts and functions of the invention are briefly summarized in Table I below.

TABLE I

LOCATION, ORIENTATION, PRODUCT AND COLOR IDENTIFICATION SYSTEM FOR THE BLIND OR VISUALLY IMPAIRED
Components List

| | |
|---|---|
| 10 | Location Orienting System |
| 20 | Cane |
| 21 | Handle |
| 22 | Sonar Obstacle Alert |
| 23 | Wrist Loop |
| 24 | Tip |
| 25 | Barcode Scanner/Alert |
| 26 | Laser Beam |
| 27 | Laser Window |
| 28 | Mirror |
| 29 | Battery |
| 30 | Cable or Wireless Signal |
| 31 | Microprocessor |
| 32 | Hardwire or Wireless |
| 33 | Barcode/Color Decoder |
| 34 | On, Off and Volume Switch |
| 35 | Speech Synthesizer |

TABLE I-continued

LOCATION, ORIENTATION, PRODUCT AND COLOR IDENTIFICATION SYSTEM FOR THE BLIND OR VISUALLY IMPAIRED
Components List

| | |
|---|---|
| 40 | Earphone |
| 42 | Hardwire to Earphone |
| 50 | Informational Barcode Site |
| 60 | Truncated Dome/Tiles |
| 61 | Radio Transmitter |
| 62 | Receiver |
| 70 | Barcode and Color Scanner |
| 71 | Wrist Loop |
| 72 | On and Off Switch |
| 73 | Battery Compartment |
| 74 | Trigger |
| 75 | Transmitter |
| 76 | Reader |
| 77 | Edge Catcher |

The location orienting system 10 includes a cane 20, a microcomputer 30, and an earphone 40. Cane 20 comprises a long tube of aluminum, fiberglass, or graphite, and has the appearance of a standard white cane used by the blind or visually impaired. White canes used by the blind or visually impaired come in two basic types: the rigid cane and the folding cane. The rigid cane is made of a long tube of steel, aluminum, fiberglass, carbon fiber or graphite with a handle 21 on one end and a nylon tip on the other. The handle 22 may have a wrist loop. The folding cane is made of similar materials and looks equal to a rigid cane, except that it is broken up into several tubular sections that are held together by an elastic cord running through the middle of the tubing, which allows the sections to be pulled apart and folded away when not in use.

Cane 20 has a handle 21, wrist loop 23, and tip 24. A barcode scanner 25 is located within the tubular body of cane 20 adjacent to the tip end. barcode scanner 25 is a conventional type, which includes a laser scanner that generates a laser scanning beam 26 and a detector, which converts the on-off pulses of the rays reflected from a barcode into an electrical binary code signal that is transmitted via a serial cable 30, for example, to the microprocessor or microcomputer via hardwire or wireless signal transmitter 32. The scanning beam 26 from the laser scanner is reflected downwardly through a laser window 27 in the body of the cane 20. The scanning beam 26 is bent at an angle of approximately ninety degrees (90°) to the longitudinal axis of the cane 20 by means of a semi-silvered mirror 28. The semi-silvered mirror 28 allows the beam reflected from the barcode to pass through the mirror and to impinge upon the detector.

Within the spirit and scope of the invention, barcode scanner 25 can assume any suitable form and provide any level of functionality. But those of skill in the art will appreciate that in accordance with one embodiment of the invention, barcode scanner 25 performs in accordance with the performance parameters illustrated in Table II below.

TABLE II

Barcode Scanner Specifications

| | |
|---|---|
| Illumination Wavelength | Red, $\lambda$ = 660 nm |
| Resolution | 5 mil (min) |
| Tilt Angle | 35° max |
| Depth of Field | Contact scanner |
| Print Contrast Ratio | 0.35 min |

TABLE II-continued

Barcode Scanner Specifications

| | |
|---|---|
| Scan Velocity | 2 to 60 inches/second |
| Ambient Light Rejection | 100 kilolux sunlight; 2 kilolux fluorescent |

A rechargeable battery pack 29 is located in the handle portion of cane 20 and provides power to barcode scanner 25. The microcomputer 31 has a barcode decoder 33 programmed to decode the signal generated by the detector of the barcode scanner 25. The binary numbers of the barcode represent decimal numbers or letters, or their combination, or any other suitable symbol or symbols, which characterize the geographical location of the barcode site. The decoded signal generated by the barcode decoder 33 is transmitted to a speech synthesizer 35, which generates an audible (preferably spoken word/phrase, or "spoken-language") signal that is transmitted to earphone 40 via hardwire cable 42 thereby to inform the user of his or her location. For example, the message could be: "100 block, East Broadway; intersection with Pearl".

Those of skill in the art will appreciate that serial cable 30 can assume any suitable form or level of functionality. But in accordance with one embodiment of the invention, a standard serial interface cable is used that meets any suitable standard such as the famous IEEE RS-232 standard.

Figure 3:
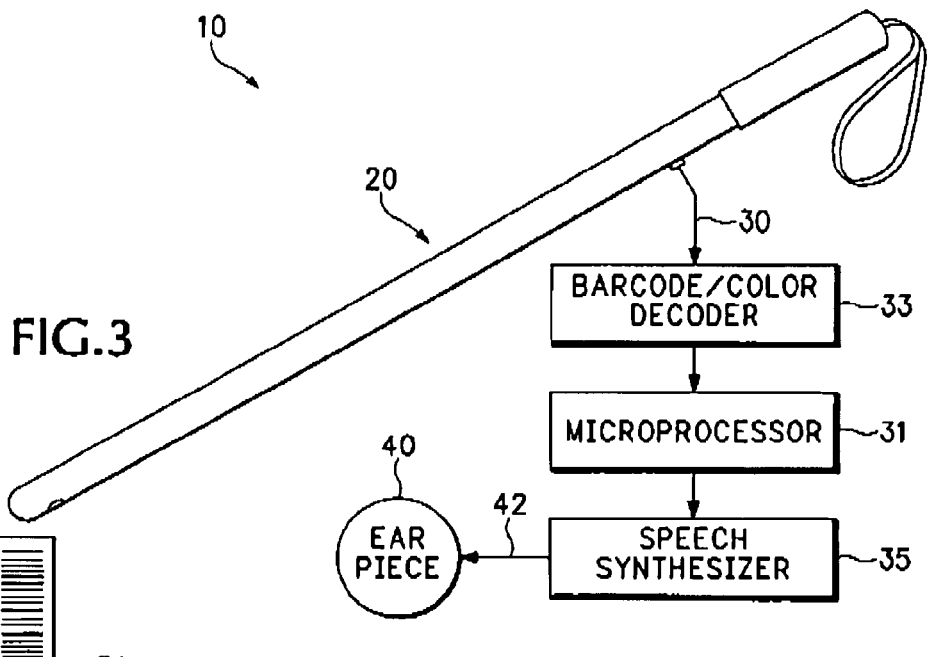
FIG. 3 is a block diagram of the location orienting system of the present invention wherein the barcode scanner is connected to the microcomputer by wire to the receiver.
Figure 3A:
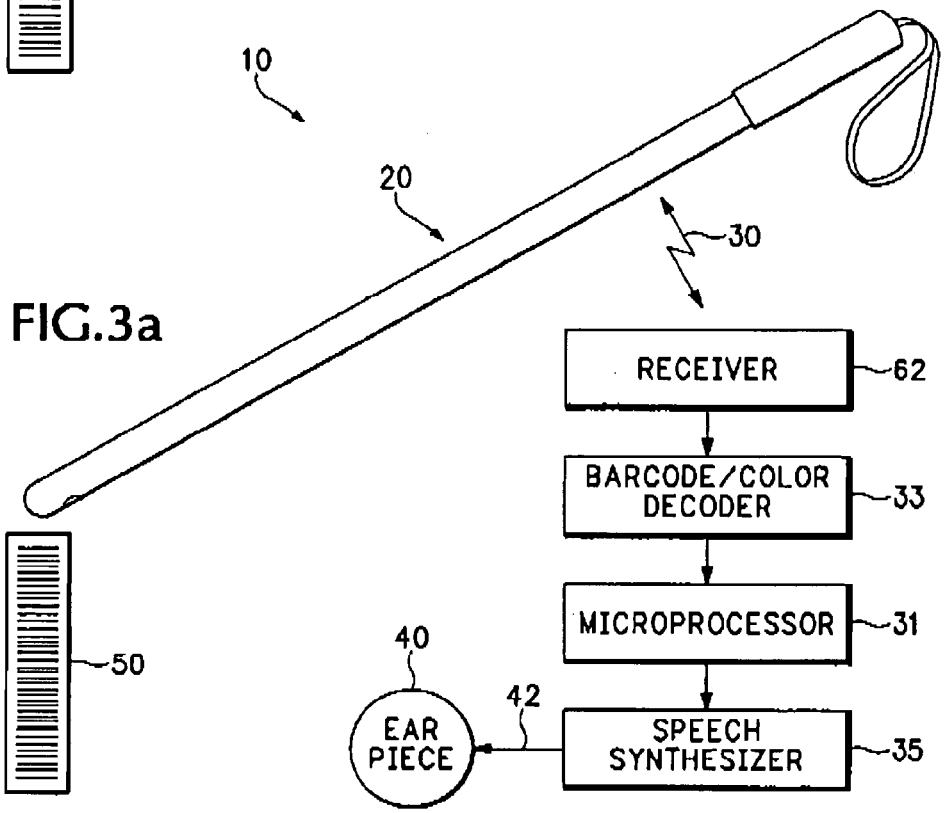
FIG. 3a is a block diagram of the location orienting system of the present invention wherein the barcode scanner is connected to the microcomputer by a transmitter and receiver.
Figure 5:
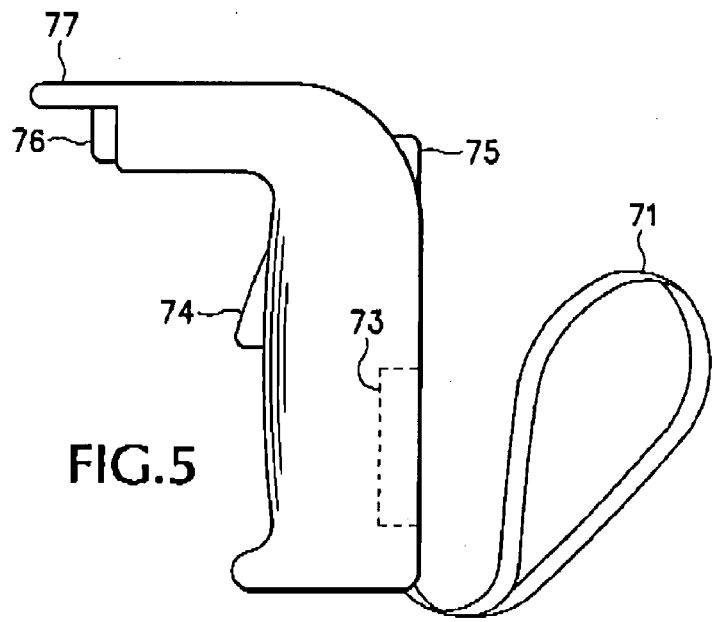
FIG. 5 is a side view of the handheld scanner incorporating a barcode/color scanner that is wireless to the receiver.
Figure 5A:
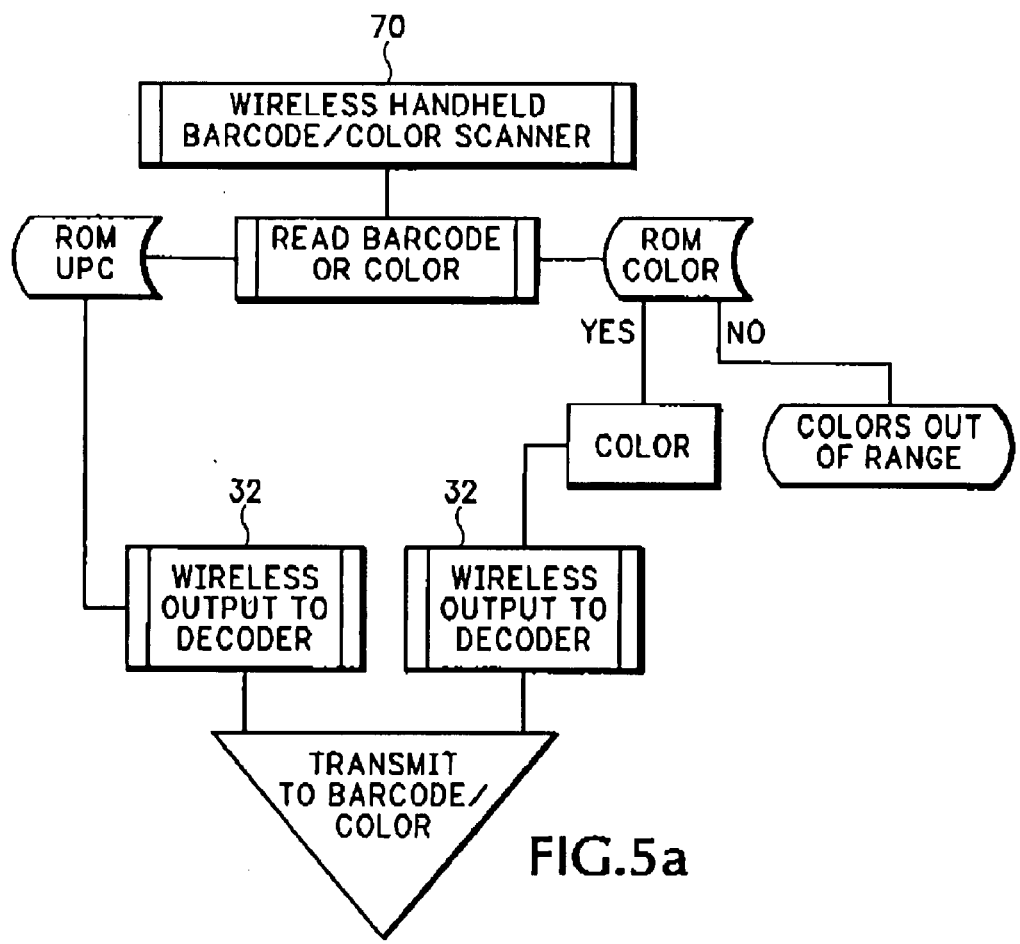
FIG. 5a is a diagram of the barcode/color scanner depicting the flow of information from the barcode/color scanner to the decoder.
Figure 6:
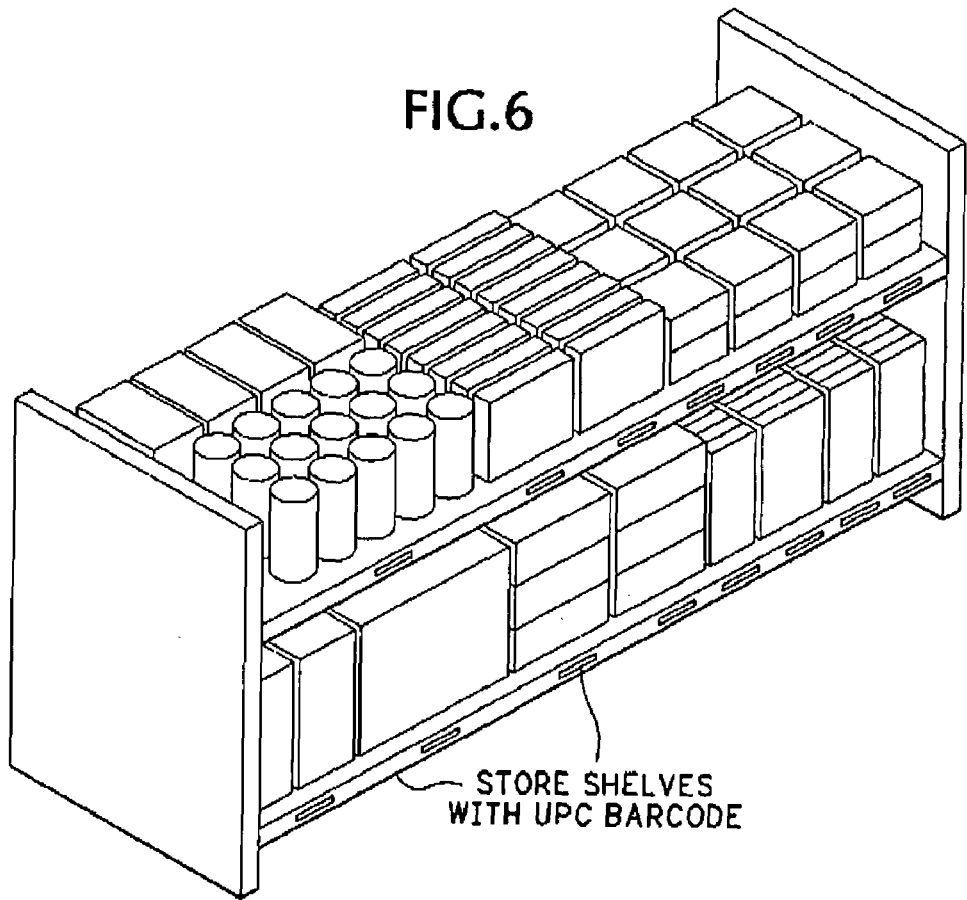
FIG. 6 is a generic example of a retail store illustrating where the barcodes are placed on shelves, wherein the handheld barcode/color scanner reads the UPC barcode and sends the signal to the user.
Figure 6A:
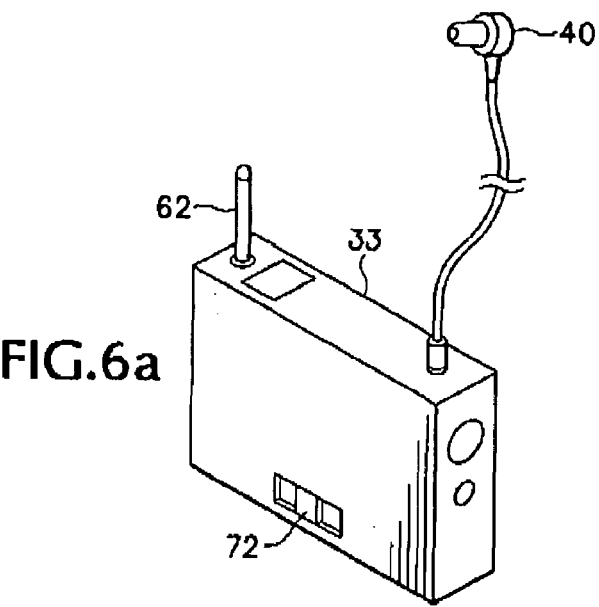
FIG. 6a is a view of the barcode/color decoder with earphone.
Figure 6B:
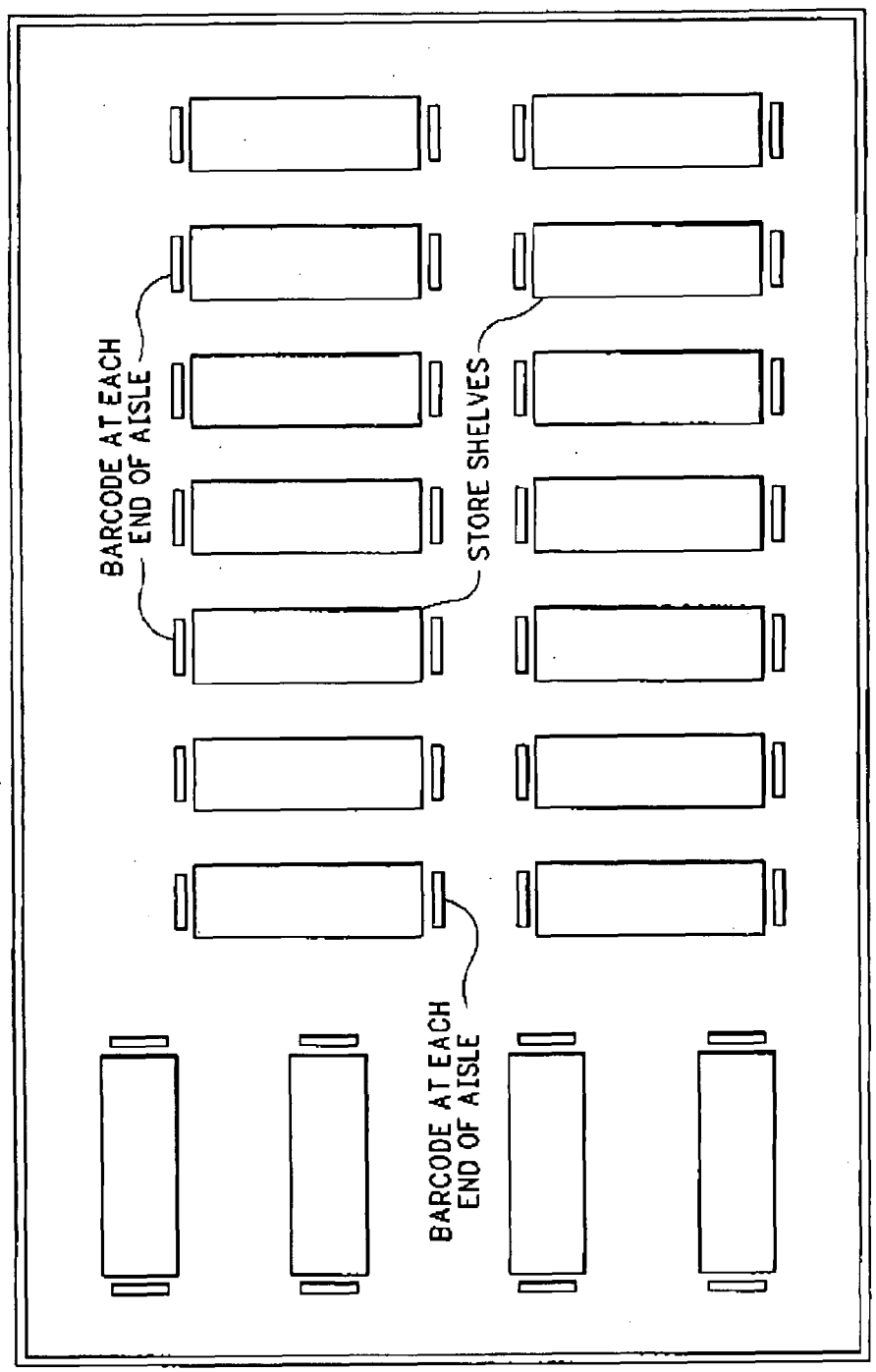
FIG. 6b is an aerial view of a generic floor plan of a grocery store, or retail store, with a barcode placed into the tiles so that the cane reads the barcode, such that the user then knows what is on the aisle, e.g. vegetables, soup, and other items.

A wireless embodiment of system 10+ and 70 is shown in FIGS. 3a and 5a. In this embodiment, the signal generated by the detector of barcode scanner 25 is transmitted to a radio transmitter 61, which transmits the signal to receiver 62. Receiver 62 transmits the received signal to barcode decoder 33. The remainder of the data processing for system 10 remains the same as in the wired embodiment of system 10.

The barcodes containing geographic information may be placed at any suitable street location within the pedestrian right of way that can be easily located by a blind or visually impaired person using a white cane. One such suitable location would be on a sidewalk just before the expansion joint near a crosswalk, at the leading edge of truncated domes 60 now mandated by the Americans with Disabilities Act (ADA).

Other suitable locations for informational barcode sites include the pavement adjacent to bus stops, at the entry areas of transit stations, in malls, in front of individual businesses, etc.

The informational barcode can be secured to the pavement by the use of weather- and traffic-proof adhesive, such as the epoxy resin adhesive used to secure highway traffic markers to the pavement on interstate freeways.

PRIMARY APPLICATION SUMMARY

A primary application for the invention is providing a location orienting system for a blind or visually impaired user. The system includes a plurality of barcode sites placed at a plurality of locations within a geographical area, each barcode site containing a barcode that contains information about its geographical location in barcode format. The user carries a white cane having a tubular body containing a barcode scanner adjacent the tip end of the cane. The barcode scanner generates a scanner beam, which passes through a window in the tubular body of the cane to scan the barcode at the barcode site at which the user is positioned, and generates an electrical signal in response to the scan. The electrical signal is transmitted to a microprocessor that is programmed to translate the electrical signal into an audio signal, and to transmit the audio signal to an earphone worn by the user.

Thus the invented Cane Magic™ system will alert the visually impaired user of obstacles in their path and slightly above head height, detect dangerous elevation changes or drop-offs that loom ahead of a user, and allow users to orient themselves and gain further information by hearing an audio message that is produced via an internal barcode scanner in the tip; the barcode scanner will alert the user to drop-offs as well with a constant beep sound.

Figure 4B:
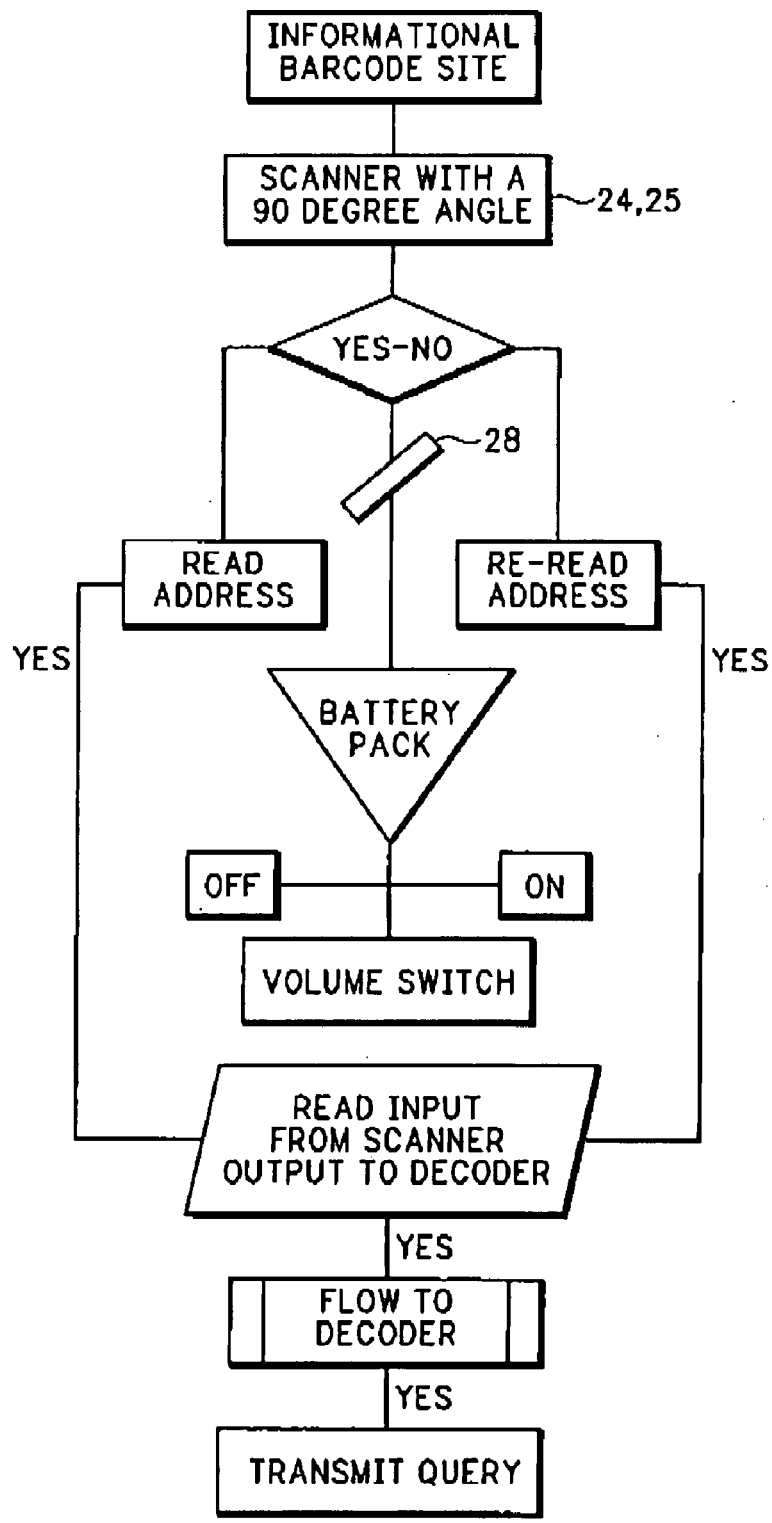
FIG. 4b is a diagram of the depicting the flow from the barcode scanner to the decoder.
Figure 4C:
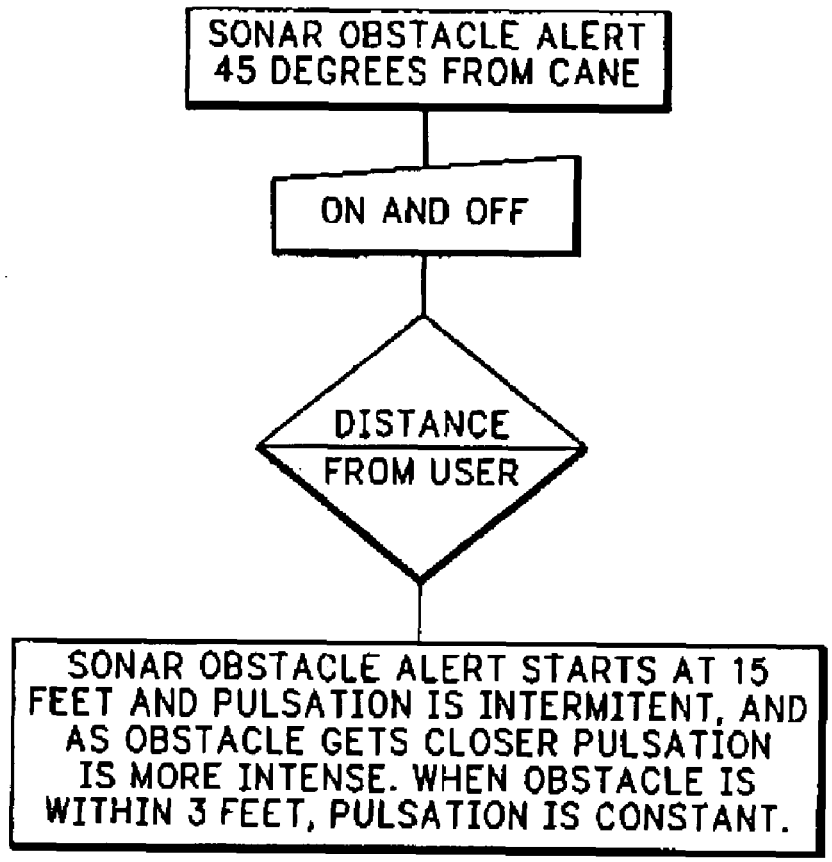
FIG. 4c is a sonar obstacle alert that starts at fifteen feet and pulsation is in the handle of the cane.
Figure 4D:
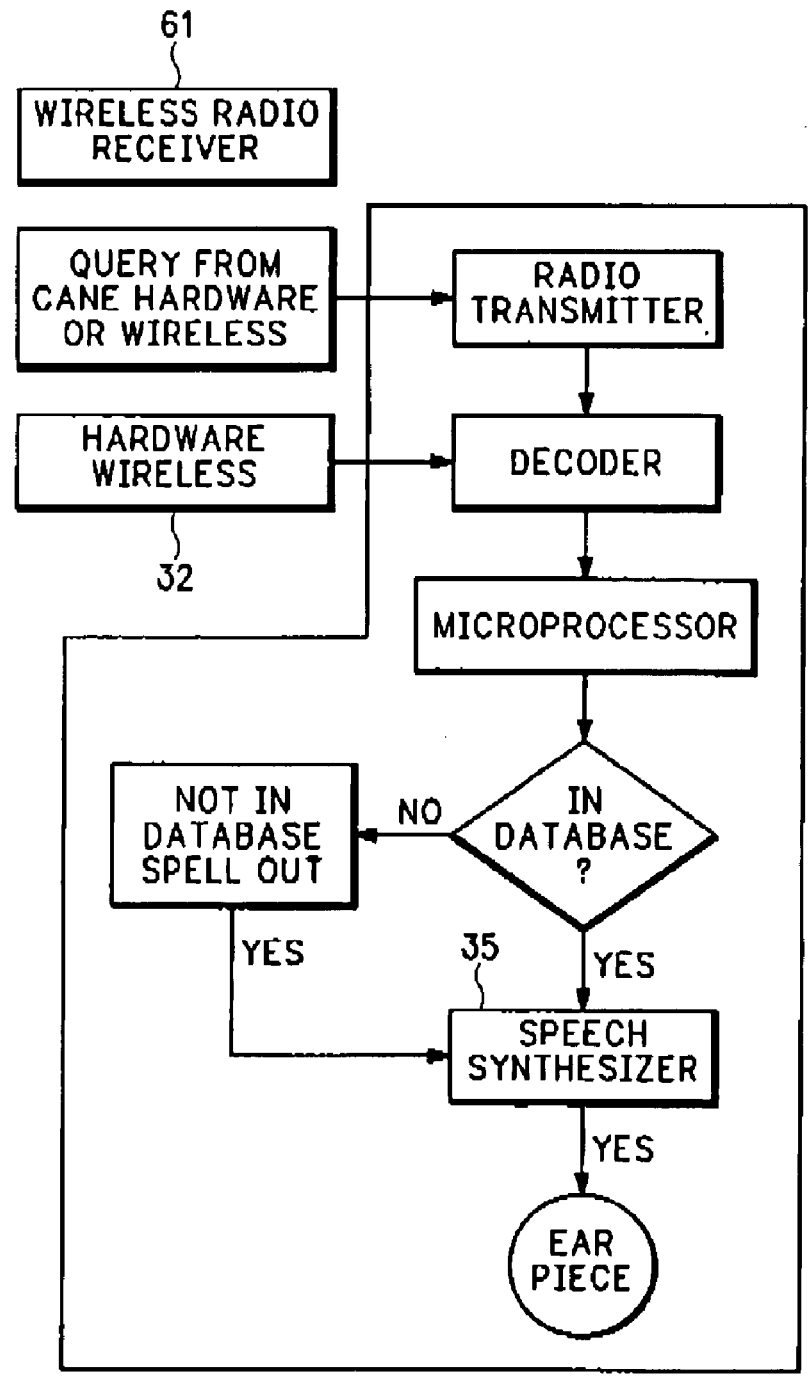
FIG. 4d is a diagram of the decoder-reader depicting the flow of information from the cane to the decoders in which the decoder decodes the information and sends the signal on to the earphone.

Through current sonar technology incorporated within the invented handle, in accordance with FIG. 4C. the handle will vibrate upon sonar detection of an obstacle, thereby allowing high levels of directional awareness of obstacles for improved safety for the blind or vision impaired user. The sonar unit will detect obstacles in the pathway as far out as fifteen feet and as close as the end of the sonar sending unit placed at the lower end of the cane handle.

A sonar component placed within the Cane Magic™ handle (reference designator 22) will be an ultrasonic dispersal and reception unit that will alert the user to the presence and distance of obstacles in his or her path. The electronic dispersal and reception unit is incorporated in the cane handle, with the electronic emitting region (ridge) being located along the lowest edge of the handle-cane connection. Working in conjunction with the sonar reception (detection) unit and set into the upper portion of the Cane Magic™ handle is a variable strength vibration production unit. The vibration unit reacts to a sonar (radar) bounce) that is received by the reception unit and is subsequently relayed to the vibration unit, hence alerting the user to obstacles in his or her path. The strength of the handle vibration will depend on the strength of the bounced signal (registered proximity of obstacle) allowing users to react in accordance with the forward directional proximity and perceived danger. The unit producing the vibration within the handle emits a varying strength vibration depending on the proximity of the obstacle. A slight intermittent vibration is produced when an object is within 10 to 15 feet (directly) ahead of the handle's sonar unit, a medium intermittent vibration is produced at 5 to 10 feet proximity of an obstacle, and when the object is closer than 5 feet from the reception unit the handle vibration is constant. The handle sonar unit will both produce and receive the electronic pulse and the cane may be produced either with or without the sonar component, according to consumer preferences.

Alternatively or additionally, in accordance with the invention, incorporation in the cane of an elevation detection unit that is a part of standard UPC barcode scanners containing a laser beam sensing unit to contact and read the barcode site. Within the Cane Magic™ design, this sensory unit (reference designator 26) will be modified to provide an audio alert when a set distance from the cane tip (reference designator 24) scanner to the pavement or reflective surface is exceeded. As the barcode scanner beam is set to a given distance and this distance is exceeded, a signal is relayed to the barcode decoder (reference designator 33) and then a decrypted signal is relayed to the audio translation unit (reference designator 33) and subsequently sent to the audio production unit (reference designator 40). The emitted warning alert for elevation changes or drop-offs will be a constant beep and be different from vocal information audibly provided through the component, thereby clearly alerting the user. This warning tone will be the only sound differing from the voice (descriptive information) output produced by the audio translation and production components.

SECONDARY APPLICATION SUMMARY

A secondary application of the invented system is illustrated in FIGS. 5, 5*a*, 6, 6*a* and 6*b*. The system in this embodiment and application provides a hand-held component 70 that is battery 73 operated of a product or color identifying system for a blind or visually impaired user. This application of the system includes utilization of two independent scanners (ROM UPC and ROM color) incorporated within the component body to access product barcode or color information. Product information scanned via a plurality of barcode sites placed at a plurality of locations within a specific geographic area, e.g. on the floor of a grocery or retail store shown in aerial view in FIG. 6*b*, containing a plurality of products. A plurality of barcode sites containing a barcode that contains information about the product in barcode format are strategically located, e.g. at the end of each aisle. The user carries a hand-held component having a separate barcode scanner incorporated at one end of the component. The barcode scanner generates a scanner beam at a reader 76 adjacent an edge catcher 77, when a trigger 74 is depressed, which scanner beam passes through a window of the component body to scan the barcode at the barcode site at which the user is positioned, and generates a decoder 32 (FIG. 5*a*) signal in response to the scan. The signal is transmitted via a transmitter 75 to a microprocessor that is programmed to translate the signal into an audio signal, and to transmit the audio signal to an earphone worn by the blind or visually impaired user. Similarly, and potentially simultaneously, the incorporated color scanner at one end of the component body scans and generates a scanner beam, which passes through a window of the component body to scan an items color at which the user is positioned, and generates another decoder 32 (FIG. 5*a*) signal in response to the scan. This signal also is transmitted via the transmitter 75 to a microprocessor that is programmed to translate the signal into an audio signal, and to transmit the audio signal to an earphone worn by the user. Individual component scanners are activated by separate on-off switches and act as independent scanners providing respective product or color information to assist the visually impaired user in retail store navigation and product selection.

The applications do not represent an exhaustive list of all applications rendered possible by the invention. Moreover, the applications are compatible with one another, in that the hand-held cane with its internal electronics can replace the hand-held barcode/color scanner if desired so that only one hand-held device is useful in navigating both streets and stores.

It will be obvious to those having skill in the art that many changes may be made to the details of the above-described embodiments of this invention without departing from the underlying principles thereof. All such suitable alternatives and variations are contemplated as being within the spirit and scope of the invention. The scope of the present invention should, therefore, be determined only by the following claims.

I claim:

1. A location orienting system for a blind or visually impaired user comprising:
    a plurality of barcode sites placed at a plurality of fixed predefined ground-level locations within a geographic area, each said barcode site containing in a fixed predefined ground-level position thereat a unique barcode that represents information about its specific geographical location in barcode format;
    a cane configured to be carried by the user, said cane having a tubular body with a handle at one end and a tip at its opposite end, said cane containing a barcode scanner within said tubular body adjacent the tip end of said cane, said barcode scanner adapted to generate and pass a scanner beam through a window in said tubular body to scan the barcode at one or more of the plurality of barcode sites at which the user is positioned and to generate a binary code signal in response to such scan, said window located adjacent said tip end in a relatively rearward facing portion of the tubular body relative to the user's direction of travel when the user extends the cane forwardly during use, the rearward facing portion of the tubular body positioned at an acute angle relative to the ground and the scanner beam projected substantially normal to the ground;
    means for transmitting said binary code signal to a microprocessor;
    a microprocessor coupled with a speech synthesizer to translate said binary code signal into an audible spoken-language signal; and
    means for transmitting said spoken-language signal to an earphone worn by the user whereby the user is apprised of his or her geographical location.

2. The system of claim 1 wherein said means for transmitting said binary code signal is electrical wiring.

3. The system of claim 1 wherein said means for transmitting said binary code signal to the microprocessor is a transmitter which transmits the binary code signal to a receiver that is in electrical communication with said microprocessor.

4. A method for location orienting a blind or visually impaired user comprising:
    placing a plurality of barcode sites at a plurality of fixed predefined ground-level locations within a geographic area, each said barcode site containing in a fixed predefined ground-level position and orientation thereat a barcode that contains information about the respective barcode site's geographical location in barcode format;
    providing the user with a cane having a tubular body with a handle at one end and a tip at its opposite end, the cane containing a barcode scanner within said tubular body adjacent the tip end of said cane, the barcode scanner adapted to generate a scanner beam which is passed through a window in said tubular body, said window located adjacent said tip end and oriented relatively rearwardly relative to the user's direction of travel when the user extends the cane forwardly during use the rearward facing portion of the tubular body positioned at an acute angle relative to the ground and the scanner beam projected substantially normal to the ground;
    scanning the barcode at the barcode site at which the user is positioned to generate a binary code signal in response to said scanning, said scanning including positioning the tip of the cane in a predefined ground-level position and in a predefined orientation adjacent a respective one of the plurality of barcode sites;
    translating the binary code signal into an audible spoken-language signal; and transmitting the audible spoken language signal to an earphone worn by the user whereby the user is apprised of his or her geographical location.

5. The process of claim 4 wherein said translating is performed by a microprocessor coupled with a speech synthesizer.

6. An apparatus for providing a blind or visually impaired user with his or her geographic location comprising:

a cane configured to be carried by the user, said cane having a tubular body with a handle at one end and a tip at its opposite end, said cane containing a barcode scanner within said tubular body adjacent the tip end of said cane, said barcode scanner adapted to generate a scanner beam which is passed through a window in said tubular body to scan a barcode at a barcode site at which the user is positioned and to generate a binary code signal in response to the scan, said window located adjacent said tip end in a relatively rearward facing portion of the tubular body relative to the user's direction of travel when the user extends the cane forwardly during use, the rearward facing portion of the tubular body positioned at an acute angle relative to the ground and the scanner beam projected substantially normal to the ground;

means for transmitting said binary code signal to a speech synthesizer, said transmitting means also contained within said body of said cane;

a speech synthesizer also contained within said body of said cane, said speech synthesizer being configured to translate said binary code signal into an audible spoken-language signal; and means for transmitting said spoken-language signal to an earphone configured to be worn by the user whereby the user is apprised of his or her geographic location.

7. The apparatus of claim 6 wherein said means for transmitting said binary code signal includes electrical wiring.

8. The apparatus of claim 6 wherein said means for transmitting said binary code signal to said speech synthesizer is a microprocessor coupled with a transmitter which transmits the binary code signal to a receiver that is in electrical communication with said speech synthesizer.

9. The apparatus of claim 6 which further comprises:

a sonar dispersal and reception mechanism within said body of said cane, said mechanism configured to detect sonar bounce from a proximate object and to produce a vibration in said handle of said cane to warn the user away from an obstacle.

10. The apparatus of claim 6 which further comprises:

an elevation detection mechanism within said body of said cane, said mechanism configured to detect a proximate elevation difference from a proximate step or drop-off and to produce a warning signal to the user to warn the user away from the step or drop-off.

11. The system of claim 1, wherein each of said plurality of barcode sites is built into a ground-level ramp structure placed at a fixed predefined location adjacent a sidewalk at an intersection of streets within the geographical area.

* * * * *